(12) United States Patent
Featonby et al.

(10) Patent No.: US 9,035,259 B2
(45) Date of Patent: May 19, 2015

(54) LEVEL MEASUREMENT SYSTEM

(75) Inventors: Paul David Featonby, Newcastle (GB); Peter Jackson, Stockton on Tees (GB); Benjamin Metcalfe, North Yorkshire (GB); Thomas John Partington, Leeds (GB)

(73) Assignee: Johnson Matthey PLC, London (GB)

( * ) Notice: Subject to any disclaimer, the term of this patent is extended or adjusted under 35 U.S.C. 154(b) by 546 days.

(21) Appl. No.: 13/119,607

(22) PCT Filed: Sep. 18, 2009

(86) PCT No.: PCT/GB2009/051222
§ 371 (c)(1), (2), (4) Date: May 27, 2011

(87) PCT Pub. No.: WO2010/032064
PCT Pub. Date: Mar. 25, 2010

(65) Prior Publication Data
US 2011/0220800 A1    Sep. 15, 2011

(30) Foreign Application Priority Data

Sep. 18, 2008 (GB) .................................. 0817107.6

(51) Int. Cl.
*G01F 23/00* (2006.01)
*G01F 23/288* (2006.01)

(52) U.S. Cl.
CPC .......... *G01F 23/2885* (2013.01); *G01F 23/288* (2013.01)

(58) Field of Classification Search
CPC ..................................................... G01F 23/00
USPC ................. 250/357.1, 363.01, 208.1, 370.09
See application file for complete search history.

(56) References Cited

U.S. PATENT DOCUMENTS 6,633,625 B2 * 10/2003 Jackson et al. .................. 378/54
7,117,588 B2 * 10/2006 Vafi et al. ........................ 29/829

(Continued)

FOREIGN PATENT DOCUMENTS

| EP | 1912045 | 4/2008 |
|----|---------|--------|
| GB | 664381 | 1/1952 |

(Continued)

OTHER PUBLICATIONS

International Search Report dated Jan. 3, 2010, application No. PCT/GB2009/051222.

(Continued)

*Primary Examiner* — David Porta
*Assistant Examiner* — Faye Boosalis
(74) *Attorney, Agent, or Firm* — RatnerPrestia

(57) ABSTRACT

An instrument adapted for the determination of fluid levels within a vessel by the comparison of the density of the fluid along the length of the instrument, said instrument comprising: (i) at least one generally linear source array comprising a plurality of sources of penetrating radiation, shielding and collimation means and a source supporting structure for supporting the sources and shielding and collimation means in a linear array (ii) at least one generally linear detector array comprising a plurality of radiation detectors, supported on a detector support structure, capable of detecting radiation emitted by the sources, and (iii) means to position the source and a respective detector array such that (a) radiation emitted from each of the sources is capable of following a linear path from the source, through the vessel and material to at least a respective one of the detectors forming a part of the respective detector array, and (b) the linear axis of the source array and the linear axis of its respective detector array are substantially parallel to each other (iv) means for analyzing the detector output signals to determine the density of the medium traversed by the beams of radiation in passing from a source to a detector characterized in that the detector support structure and/or its associated electrical circuits and connectors is formed from a plurality of modular portions, each modular portion being adapted to be joined to an adjacent portion to provide a detector array of the required length.

19 Claims, 4 Drawing Sheets

(56) References Cited

U.S. PATENT DOCUMENTS

| | | | |
|---|---|---|---|
| 7,622,719 B2 * | 11/2009 | Spahn | 250/370.11 |
| 2008/0142718 A1 | 6/2008 | Mormann | |

FOREIGN PATENT DOCUMENTS

| | | |
|---|---|---|
| GB | 2326232 | 12/1998 |
| WO | 0022387 | 4/2000 |
| WO | 0070314 | 11/2000 |
| WO | 0071640 | 11/2000 |
| WO | 0077502 | 12/2000 |
| WO | 03012378 | 2/2003 |

OTHER PUBLICATIONS

Great Britain Search Report dated Jan. 19, 2009, application No. GB0817107.6.

* cited by examiner

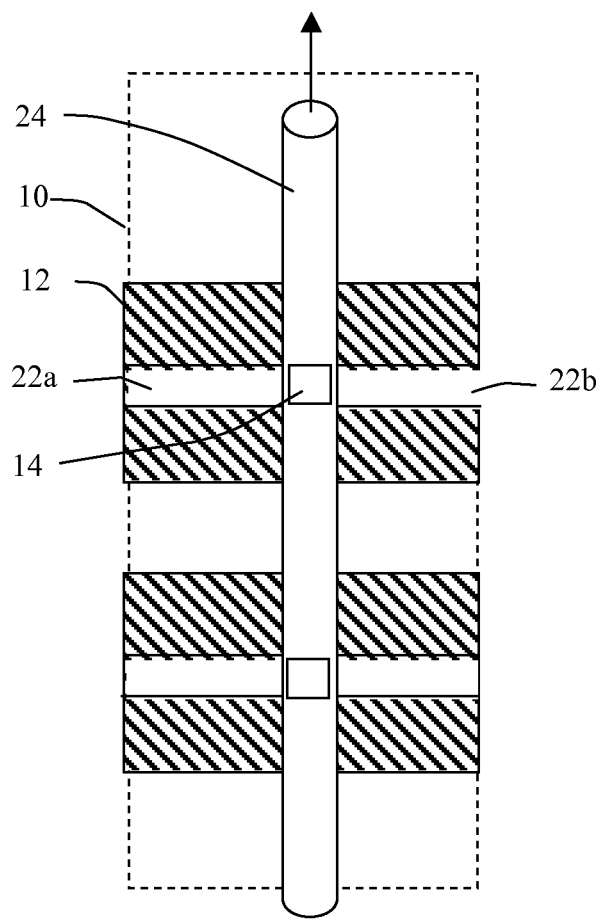 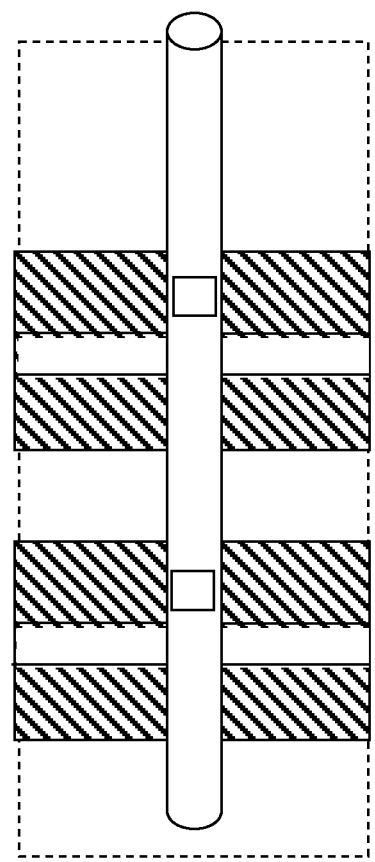

LEVEL MEASUREMENT SYSTEM

CROSS-REFERENCE TO RELATED APPLICATIONS

This application is the U.S. National Phase application of PCT International Application No. PCT/GB2009/051222, filed Sep. 18, 2009 and claims priority of British Patent Application No. 0817107.6, filed Sep. 18, 2008, the disclosures of both of which are incorporated herein by reference in their entirety for all purposes.

FIELD OF THE INVENTION

The present invention concerns a level measurement system and apparatus and a method for measuring the level of a material within a vessel. More particularly the invention concerns the detection of the location of an interface between different materials contained in a vessel.

BACKGROUND OF THE INVENTION

Level measurement systems, i.e., for use in measuring the level of a material within a vessel, are well known. It is also known to locate the boundaries between different materials in a vessel by measuring the density of the vessel contents at different locations to form a density profile of the vessel and contents in order to identify density changes which are indicative of boundary regions. For example, it has been proposed in WO-A-00/22387 to measure the density profile of a medium by providing an axially distributed array of sources of ionising radiation, e.g. $^{241}$Am which is a source of low energy gamma radiation, to give collimated beams of said radiation and an axially distributed array of detectors disposed so that the medium under study extends between the sources and the detectors. By monitoring the radiation received by the detectors, the amount of radiation absorbed by the medium from each beam can be determined and so variations in the medium density can be detected. The system of WO-A-00/22387 employs linear arrays of sources and detectors which may extend to several meters in length when the system is intended for use in large vessels such as oil separators and storage vessels. In certain cases, such as high pressure applications or harsh environments, the level measurement system must be contained in a case of a minimum thickness and/or of a particular material. This can impose constraints on the type of radiation that may be used which in turn determines the type and amount of shielding and collimation required. A problem with forming such long source and detector arrays is that dense materials can be required to provide shielding and collimation of the sources and this results in a heavy instrument which is expensive and difficult to manufacture and manoeuvre. Also such long instruments may be prone to breakage during manufacture and installation. It is an object of the invention to provide a level measurement system that overcomes some, at least of the problems with the prior art systems.

SUMMARY OF THE INVENTION

According to the invention we provide an instrument adapted for the determination of fluid levels within a vessel by the comparison of the density of the fluid along the length of the instrument, said instrument comprising:
(i) at least one generally linear source array comprising a plurality of sources of penetrating radiation, shielding and collimation means and a source supporting structure for supporting the sources and shielding and collimation means in a linear array,
(ii) at least one generally linear detector array comprising a plurality of radiation detectors, supported on a detector support structure, capable of detecting radiation emitted by the sources, and
(iii) means to position the source and a respective detector array such that:
 (a) radiation emitted from each of the sources is capable of following a linear path from the source, through the vessel and material to at least a respective one of the detectors forming a part of the respective detector array, and
 (b) the linear axis of the source array and the linear axis of its respective detector array are substantially parallel to each other;
(iv) means for analysing the detector output signals to determine the density of the medium traversed by the beams of radiation in passing from a source to a detector characterised in that the detector support structure and/or its associated electrical circuits and connectors is formed from a plurality of modular portions, each modular portion being adapted to be joined to an adjacent portion to provide a detector array of the required length.

In another embodiment, the invention provides a detector array assembly for a level measurement instrument, comprising a plurality of detectors capable of detecting radiation mounted on a support structure formed from a plurality of modular portions, each portion being adapted to be joined to an adjacent portion to provide a detector array of the required length.

In a further embodiment, the invention provides a detector array comprising a support structure, a plurality of radiation detectors and a plurality of modular circuit board portions, said circuit board portions comprising means to mount at least one radiation detector thereupon, and means to join the support structure to more than one modular circuit board portions, thereby to form a detector array of required size.

In yet another embodiment, the invention provides a method for assembling a detector array for use in a density profiler instrument comprising forming an elongate circuit board from a plurality of modular circuit board portions.

BRIEF DESCRIPTION OF THE FIGURES

The invention will be further described, by way of example only, with reference to the accompanying drawings which are:

FIGS. 3A & B provide sectional views of a preferred embodiment of the invention;

DETAILED DESCRIPTION OF THE FIGURES

Figure 1:
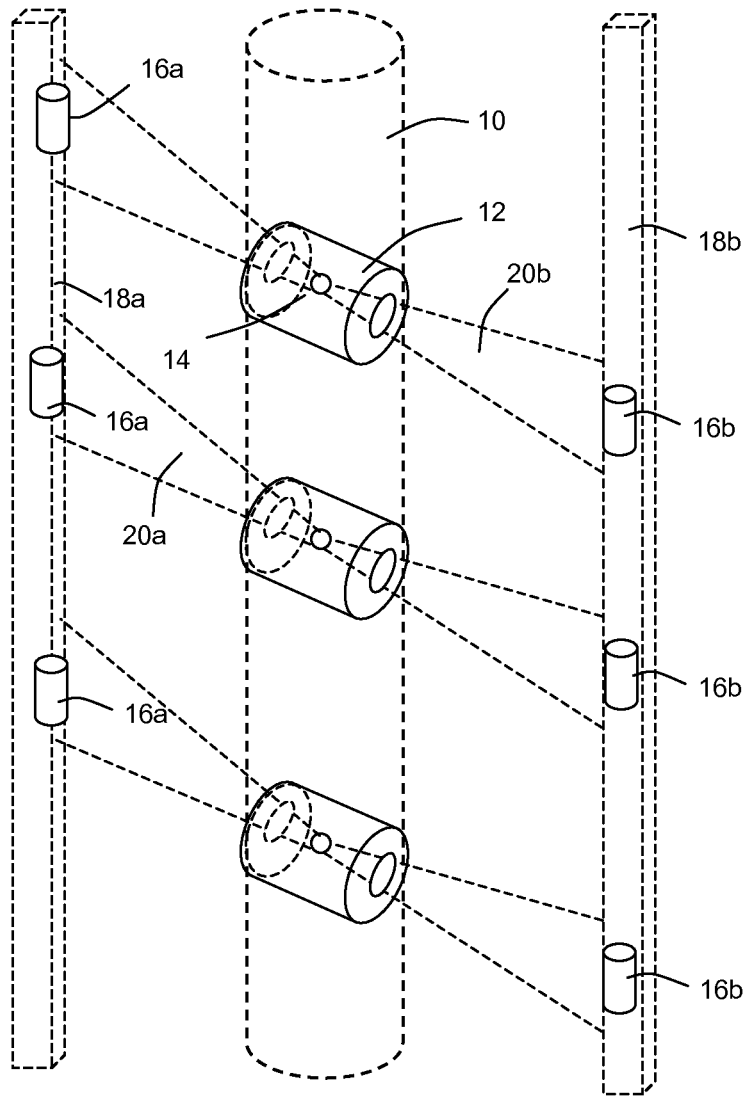
FIG. 1 provides a schematic view of a portion of a level measurement instrument according to the invention.

The source array includes a plurality of radiation sources, which are preferably sources of gamma radiation. The energy of the source radiation is typically not more than about 1000 keV and is desirably lower than this. Preferably the energy of the source radiation is not less than about 300 keV. The source can be a radioactive isotope as is used in conventional (single source/detector) density gauges where the radiation source is commonly the 661 keV gamma radiation from $^{137}$Cs. Suitable sources include $^{37}$Cs, $^{133}$Ba, $^{60}$Co, especially when the level detector is intended to be installed such that at least one of the walls of the vessel level is between the or each source and its respective detector. When the instrument is intended to be fitted into a vessel such as an oil separator through a standard port, the beam length is preferably less than 50 cm, more preferably less than 30 cm and for this use a less energetic source is thus desirable and energies of less than 500 keV, particularly less than 300 keV and optimally less than 100 keV, are desirable in this invention. Suitable low-energy sources include $^{133}$Ba which is a 356 and 80 keV gamma source and, particularly desirably, $^{241}$Am which is a 60 keV gamma source. The use of an $^{241}$Am source enables the use of a path length of from 5 to 10 cm so that a level measurement instrument can be installed through a single 15 cm port. For higher energy sources such as $^{137}$Cs, a greater path length is optimal, typically between 20 cm and 40 cm, e.g. about 30 cm. Other radioisotope sources can be used if desired, especially those having properties as described above, but other such sources are not generally readily available from commercial sources. The use of low-energy sources makes equipment handling and source shielding safer and/or easier. The source radiation could also be X-rays and, although robust compact sources are not easy to engineer, for such sources, intrinsic source half life is not a problem.

The radiation source will usually be chosen to have a relatively long half life, both to give the equipment a satisfactory service life and to reduce the need to recalibrate to take account of reduction in source intensity from source ageing. Usually, the half life of the radioisotope used will be at least 2, and desirably at least 10, years. The half lives of the radioisotopes mentioned above are: $^{137}$Cs gamma ca. 30 years, $^{133}$Ba ca. 10 years and $^{241}$Am ca. 430 years.

Desirably the source intensity will be at least about $4\times10^7$ more usually from $4\times10^8$ to $4\times10^9$, Becquerel (Bq). The use of sources with lower intensity may require unduly long integration times to obtain adequately precise results (signal to noise ratio) and more intense sources are relatively expensive and/or may lead to swamping of the detectors. $^{241}$Am and $^{137}$Cs sources having an intensity of about $1.7\times10^9$ Bq are readily commercially available and are suitable for use in this invention.

The shielding and collimation means is preferably formed from a different material from that of the supporting structure. The shielding and collimation means is formed from a material which is highly attenuating to the penetrating radiation. Normally this is a dense material such as lead, or a heavy alloy such as tungsten-copper. Such alloys may be brittle and so a benefit of forming the shielding and collimation from a different material from that used to form the support structure is that the array as a whole may be less brittle and therefore less prone to mechanical failure during fabrication, installation and use.

The shielding and collimation means is shaped so that the emission of radiation is confined, so far as possible, to a beam of suitable width directed through the fluid medium towards one or more detectors. Normally this is achieved by providing a channel or aperture through the shielding material surrounding the source such that emission of radiation from the source is substantially confined to emission of a beam of radiation through the channel. It is often desirable to collimate the source radiation into more than one beam, e.g. by providing more than one channel in the shielding material, so that radiation from a single source may be directed at more than one detector. In this case, the detectors may be in different positions within or outside the vessel and they may form part of the same linear array or they may be located in different detector arrays. The shielding and collimation means for each source may be formed into a single unit which is adapted to be supported by the supporting structure. The unit may be shaped to fit into the structure, e.g. as a "plug" into an aperture formed in the structure for receiving the unit. The unit may be held in place in or on the supporting structure by clips, bolts or other securing means.

The supporting structure is preferably formed from a material which is sufficiently stiff to support the sources and shielding/collimation means. The material from which the support structure is formed is normally less dense and less attenuating to radiation than the shielding material. It is also normally stronger (higher strength/weight ratio) and/or stiffer that the shielding material. The material must also be able to withstand the environment in which the level measurement system is intended to operate. A preferred material is steel, preferably stainless steel. The support structure may be formed into a rod which may be solid or in the form of a framework or lattice in order to save weight and/or material. However formed, the support structure includes means for receiving the shielding and collimation means; such means preferably includes sockets extending into and optionally through the support structure. In one form of the invention, the support structure may be provided in modular portions which may be joined together, each portion to an adjacent portion, to provide a source array support of the required length. When the support structure is provided in modular portions, each portion includes means to connect it to another portion of the structure, the means being robust and sufficiently strong to provide a completed support structure of sufficient strength and stiffness. Such means may include bolts, flanges and may further include locating portions such as studs and sockets provided on each portion which are adapted to engage each other when the portions are correctly aligned. Each modular portion of the source support structure may be provided with means to support one or more shielding and collimation units. Although the source shielding and collimation units will often be evenly spaced apart along the support structure it may be preferable in certain situations, to provide unevenly spaced apart sources, or to provide a significant part of the length of the support structure in which no source is present. The apparatus of the invention, in which the shielding and collimation is formed from a different material as a unit which can be supported on the support is of particular benefit in such a situation because the part of the length of the source array which is not intended to house a source need not contain any heavy shielding material, thus saving weight and cost.

The source array preferably further includes means to shield the radiation from the detectors such that the sources may be shielded during installation, replacement or repair operations. For example, this can be achieved by placing some or all of the sources in the array on or in a separate support member or "source arming rod", which can be moved with respect to one or more collimation channels in the surrounding shielding material such that in a first position, at least one collimation channel is aligned with at least one of the sources such that a beam of collimated radiation is emitted along the collimation channel; and in a second position at least one of the sources is out of alignment with a collimation channel such that the emission of radiation from the source is blocked by the shielding material. Such an arrangement is described in WO-A-00/22387. The arming rod, containing the sources may be adapted to be moved axially with respect to the source array or rotated relative to the shielding and collimation means. Shielding of the sources may also be achieved by alternative means such as shutters which are operable to cover the collimation channels to block the radiation beam. The source arming rod may be formed in sections or modules.

The type of detectors used in the apparatus and method is not critical although in practice compact devices will usually be chosen. The detectors may be electrically powered, e.g., Geiger-Muller (GM) tubes or scintillation detectors linked with photomultipliers, or un-powered as in simple scintillation devices. Among electrically powered detectors, GM tubes are particularly convenient, because they are electrically and thermally robust and are available in mechanically robust forms. Among un-powered detectors scintillation detectors linked to counters by fibre optic links (optionally with photomultipliers outside the container for the medium under test) are particularly useful. When electrically powered detectors are used and especially when the level measurement apparatus is used in a combustion or explosion risk environment, it is desirable that the total electrical energy and power associated with the detectors is sufficiently low as not to be a significant source of ignition in the event of system failure (particularly resulting in direct contact between combustible or explosive materials and any electrically live components). Photomultipliers generally require relatively large amounts of electrical power (as compared with GM tubes). GM tubes are readily available with physical dimensions of cylinders about 40 mm long and about 12.5 mm in diameter. The resolution may be improved by using smaller devices (GM tubes as short as about 5 mm are available) or by spacing the GM tubes more closely e.g. with their axes arranged perpendicular to the linear axis of the array, or by offsetting their axes and overlapping the cylinders in the direction of the linear axis of the array, although closer spacing may increase the extent of cross-talk. Using commercially available 40 mm GM tubes it is practical to fabricate arrays containing up to about 100 detectors, whilst restricting the total power in the detector array so that it satisfies the "intrinsically safe" rating for use in combustible or explosive environments as found in oil/gas extraction. Using un-powered scintillation detectors with fibre optic links is even safer as there are no electrical components necessary in the detector array.

More than one array of detectors may be provided, and in a preferred embodiment of the instrument, two linear arrays or columns of detectors are provided which are radially angularly displaced from each other. Desirably, the beam-lengths of the radiation between the sources and the corresponding detectors in the different arrays are substantially equal. This can readily be achieved by locating the columns of detectors radially substantially equidistant from the source array. When more than one detector array is used, the number of detectors over the length of the instrument may be increased compared with using a single detector array, leading to an improvement in resolution. A further benefit from using multiple detector arrays is that where electrically powered detectors are used, the reduction in the number of detectors in each array reduces the power supplied to each array making it easier to comply with safety requirements in when dealing with highly combustible oil/gas systems. We have successfully built profilers that meet the "intrinsic safety" requirement in oilfield operation.

The detectors are arranged in at least one linear array, supported on a detector support structure, which is sufficiently stiff and strong to support the detectors in linear alignment in use. The structure may take the form of a rod, framework, etc. Alternatively the support structure may comprise a circuit board. The detectors are physically supported on the circuit board and electrically connected to components of the circuit board using standard connecting means. The support structure preferably supports electrical or optical connectors, jumpers and circuits, preferably in the form of a printed circuit board, to which the detectors are connected.

The detector support and/or its associated electrical circuits and connectors may be provided in modular portions which may be joined together to provide a detector array of the required length. This embodiment enables very long detector arrays, for example longer than 10 m, to be fabricated. The majority of the modular portions are preferably functionally identical, although it is likely that some, especially those forming the ends of the support or circuit board may differ in certain respects. Each modular portion may comprise a circuit board, which when joined to one or more additional modular portions, forms an elongate circuit board. When the detector support structure is provided in modular portions, each portion includes means to connect it to another portion of the structure, the means being robust and sufficiently strong to provide a completed detector support structure of sufficient strength and stiffness. Such means may include bolts, flanges and may further include locating portions such as studs and sockets provided on each portion which are adapted to engage each other when the portions are correctly aligned. Alternatively the circuit boards may be joined together by soldering or a similar method. The modular portions may be joined by mounting adjacent portions on a single support. The detector array may comprise a support structure, a plurality of radiation detectors and a plurality of modular circuit board portions, said circuit board portions comprising means to mount at least one radiation detector thereupon, and means to join the support structure to more than one modular circuit board portions, thereby to form a detector array of required size. The modular portions may be mounted on a steel or other metal support structure, optionally spaced apart from one another. In this way it is possible to provide a detector array having similar thermal expansion characteristics as the source array.

When the electrical circuit boards are provided in modular portions then they may be provided with connection means to connect a portion to an adjacent portion. Alternatively or additionally, each portion may include electrical connection(s) by which power and/or signals to and from the detector(s) mounted on the portion of circuit may be connected, independently of the other circuits, to a control device such as a signal generator, a signal processing unit or to a power source. In a preferred embodiment, where the detector support structure is provided in the form of modular units, each modular unit carries an electrical circuit module.

In a preferred form of the apparatus we provide more than one electrical conduit, i.e. cable or circuit board track, for carrying the high voltages, required to power the detectors, from a voltage generator to the detectors. This arrangement has a number of advantages. These include the provision of redundancy in the detector array so that, should one of the electrical conduits, voltage generators or power sources fail, only those detectors which draw power from the failed component are affected. For that reason in a further preferred arrangement, the detectors which are connected to the same power source, voltage generator or electrical conduit are spaced apart and interspersed with detectors connected to a different power source or voltage generator by a different electrical conduit. More preferably the detectors are arranged in a pattern such that adjacent detectors are connected to different power sources by different electrical conduits. Preferably the detectors are connected so that when the number of electrical conduits is n, each nth detector in the array is connected to the same electrical conduit. In this way, when three electrical conduits A, B and C are provided, the detectors are arranged so that for a linear array of detectors Dx, where x is the number of an individual detector and the detectors are arranged in numerical sequence, D1 is connected to A, D2 to B, D3 to C, D4 to A, D5 to B and so on. Preferably at least three electrical conduits are provided. An additional advantage of providing more than one conduit for carrying the high voltage required to power the detectors is that when more conduits are used, the current carried by each conduit is less and this reduces the risk of sparking so that the instrument may be intrinsically safe according to the accepted standards. Each electrical conduit or track may be connected to a separate power source or voltage generator.

The modular units may be of any suitable size but we have found that a length of up to about 1 meter is practical, e.g. from 0.2 to 1.5 meters. Each module may be provided with means to connect several detectors, for example from 2 to about 20 detectors, depending on the size of the module and the size of the detectors. Each detector may be connected to the circuit module by standard connections, such as push-fit connectors or simply by soldering. The detector is preferably also fixed to the support and/or circuit by means of a standard electrically insulating adhesive or moulding compound of the type conventionally used for the manufacture of electronic devices.

In a further alternative embodiment, where the source and/or detector support structure and electrical circuits are provided in the form of modular portions, adjacent portions may be adapted to be relatively moveable, (e.g. jointed or hinged) with respect to each other, for example by providing suitable connecting devices such as hinges or cables, which may be power or data cables used to carry power or data between the detectors and a power supply or signal processor. The relative movement of the portions may facilitate the installation or assembly of a relatively long detector or source array in circumstances where the available space around the installation is limited. The portions may be more rigidly secured to each other during the installation or assembly procedure. This could be achieved using a device such as a stiffening or locking rod or pin. Alternatively the relatively movable portions may be subsequently joined using non-movable means such as bolts or a stiffening rod or board.

The source array and detector array(s) are preferably located within an outer housing or tube. The outer housing is formed from a material, at least in the vicinity of the collimated beam(s) of radiation emitted by the source, which is sufficiently transparent to the radiation that the operation of the level measurement system is not thereby impaired. The outer housing should be of a strong material which is tolerant of the environment in which the source array is to be placed in use, which may be subject to high pressures. Preferred materials for the outer housing include titanium and titanium alloys for level measurement systems which use low energy radiation (e.g. $^{241}$Am). These are light and relatively transparent to gamma radiation. For high energy radiation (e.g. $^{137}$Cs) stainless steel may be used.

The source and detector arrays may be provided in the form of an integral density profiler instrument in which the source and detector array(s) are mounted on or to a supporting housing which supports the arrays in a fixed relationship, preferably aligned parallel to each other, a fixed distance apart, with each radiation beam directed towards a separate detector. This is the type of arrangement described in WO-A-00/22387 and it is useful for providing a compact density profiling instrument having a relatively short beam length (i.e. the distance between the source and detector), generally less than 50 cm, usually about 15-30 cm. Alternatively the source arrays(s) and detector array(s) may be installed separately within a vessel, outside a vessel, normally adjacent the vessel wall(s), or into sockets or dip tubes formed in a wall of a vessel. For high energy radiation sources such as $^{137}$Cs, it is generally preferred to install the source arrays(s) and detector array(s) separately, because the optimal path length between them is generally large (typically about 30 cm). It may be necessary to mount parts of the level measurement system externally of the vessel if there is significant internal structure inside the vessel.

The level measurement system includes means for analysing the detector output signals to determine the density of the medium traversed by the beams of radiation in passing from a source to a detector. Such means normally comprises a counting device or other such device capable of passing a signal to a data processing means which carries information as to the amount of radiation detected. The detector output signals are normally carried to the data processing means using a cable, usually one cable carries the signal from one detector. The counting devices for any of these detectors will usually be electronic and each detector will be associated with a counter which will usually be linked to a device that translates the detection (count) rate to a measure corresponding to density for each detector. A counter may be provided for each detector, but time division multiplexing of counters can be used although with a resultant increase in the time needed for measurement of a density profile. Multi-channel counters provide a convenient means of counting the signals received from more than one detector. The counting device or data processing means normally includes a signal processing function capable of applying a smoothing algorithm to the raw signal in order to eliminate signal noise and to help identify significant changes in the signal which may indicate a change in the density of the medium through which the radiation has passed. Such analysis generally includes an averaging function and statistical analysis routines.

The amount of radiation received by a detector is less than the radiation emitted by the source because the radiation is attenuated, e.g. by scattering and reflection, by the materials through which it passes before impinging upon the detector. It is well known that different materials attenuate radiation to a different extent, depending largely upon the density of the material. Therefore, assuming that the source radiation and distance between the source and each detector is identical, a statistically significant difference in the radiation counted by two different detectors at different locations in the array indicates that the material between the source and each detector has different attenuation characteristics and density. By comparing the radiation monitored by several of the detectors in the detector array and after compensating for any difference in the path length between source and detector, a density profile of the material between the source array and the detector array may be obtained. From such a profile, changes in material density may be identified and correlated to a location within the vessel so that the depth and location of any of the fluid phases present may be calculated.

When the instrument is installed in remote or hostile locations, it is advantageous to provide such technical features as are available to enable the instrument to continue in operation when one or more components have failed. It is therefore preferred to provide a method of compensating for failed detectors so that when a detector is not functioning, the radiation detected by adjacent detectors may be used to estimate the density (or relative density) at locations between the working detectors. Therefore in this embodiment we provide a means for calculating a density at a location between non-adjacent detectors using the radiation detected by said non-adjacent detectors and stored information concerning a previously recorded radiation count. The calculation may use stored information about the density (or measured radiation) last measured by the failed detector and/or the working detectors and information about changes in radiation or density measured by the adjacent, working detectors and may include interpolation of the adjacent detector reading or alternative methods to calculate a density in locations intermediate the working detectors. The failure of one or more detectors therefore results in a loss of precision of the local density measurement but allows the instrument to provide information until a faulty detector can be replaced. Likewise, if more than one detector array is provided, then a loss of information caused by failure of one or more detectors (or even an entire array) may be compensated for using estimated density values calculated from the information available from functioning detectors, including stored information. Alarm means may be provided to alert a user about a failed component.

The output from the analysis means may be in the form of raw data concerning radiation received by detectors disposed at different locations along the array. Such data may be used by a control system to control the contents or flow of material in the vessel or to generate an alarm event in response to the data. Alternatively the output is in a graphical form to represent the calculated density of the material in the vessel between the source array and the detector array at different positions. Since the user generally requires information concerning changes in the material to indicate boundaries between different materials or phases within the vessel it may not be necessary to calculate an absolute density for the material. If required, density may be calculated by using a calibration for the materials likely to be present in the vessel.

The counting means and/or the signal processing means and/or the data processor(s) and controllers are typically housed in a single housing located at one end of the density profiler instrument. The housing also contains a power source or converter such as the high voltage generator. Electrical power may be provided by a power supply located within the housing or by power cables from an externally located power supply. Means are provided to transmit data from the data processor(s) to an external location.

Figure 2:
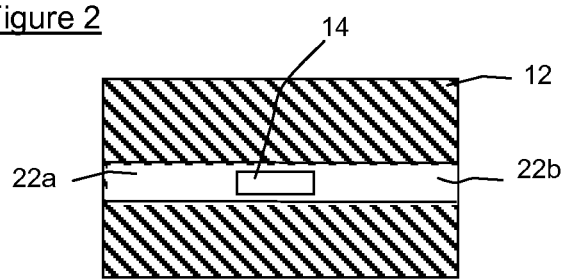
FIG. 2 provides a sectional view of a portion of a shielding unit.

In FIG. 1, a portion of a level measurement instrument according to the invention is shown schematically. A support structure 10 made from stainless steel supports shielding and collimating housings 12, made from lead and which each contain a source 14 of gamma radiation. The housing is shaped internally in such a way as to collimate the radiation emitted by the source into two beams 20a and 20b each directed towards detectors 16a and 16b respectively. The detectors 16 are supported on structures 18a, 18b in linear alignment. The support structures 10 and 18 are shown in dashed lines in order to more clearly show the source and detector blocks within the supports more clearly. The use of separate units 12 inserted into a support structure 10 enables the apparatus to be made lighter than if the collimation and shielding were machined into a single piece of lead. A shielding unit is shown in more detail in FIG. 2. The housing unit 12, made of lead includes a channel 22a/b for holding a source 14 and for collimating two beams of radiation. Each source 14 is preferably located in an individual holder to facilitate handling and insertion into and removal from the apparatus.

FIG. 3 shows an embodiment of the invention in which the sources 14 are supported within a source-holder rod 24 which is capable of being moved relative to the units 12.

In FIG. 3A, the rod 24 is positioned so that the sources are in line with the channels 22 so that beams of radiation are collimated and emerge from the housing. When the rod 24 is moved in the direction of the arrow to the position shown in FIG. 3B, the sources are no longer in line with the channels so that radiation is blocked by the shielding material of the housing 12.

Figure 4:
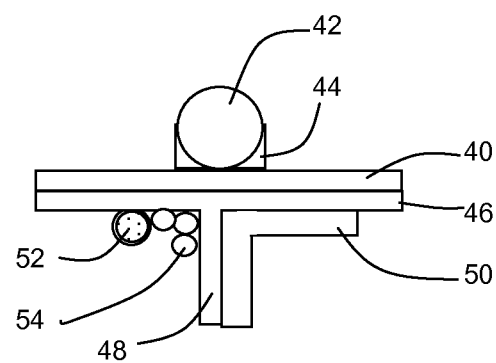
FIG. 4 provides a schematic transverse section through a portion of a detector.
Figure 5:
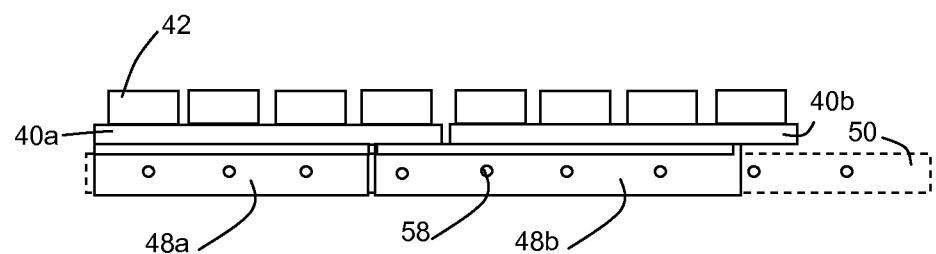
FIG. 5 provides a schematic side view through a portion of a detector.

FIG. 4 shows a transverse section view through a portion of the detector array assembly. A circuit board 40 carrying Geiger-Müller (GM) tubes 42 and connectors 44 is mounted on a support board 46, having a perpendicular portion 48. Portions 46 and 48 of the support board together form a T-shaped cross-section. The support board is fixed to an angled steel rod 50 by rivets 58 (shown in FIG. 5). The steel rod ensures that the thermal expansion and contraction of the detector assembly can be matched to the thermal expansion of the source assembly. Power cables 54, carrying a high voltage supply to the GM tubes, and data cables 52 for carrying signals from the GM tubes to counting modules in a control housing, are run along the angle of the T-shaped support board. FIG. 5 shows a simplified side view of a portion of the detector assembly, showing two modular portions comprising circuit boards 40a and 40b, each carrying four GM tubes. The complete assembly comprises at least five modules. The cabling and connectors have been omitted from the drawing. FIG. 5 shows how the two circuit boards 40a and 40b are fixed to the support 46, each circuit board forming a module of the modular detector array assembly. When the support board is sectional as represented by the sections 48a and 48b, the join between adjacent sections of the support board should not be in register with the spaces between the circuit boards 40a and 40b.

Figure 6:
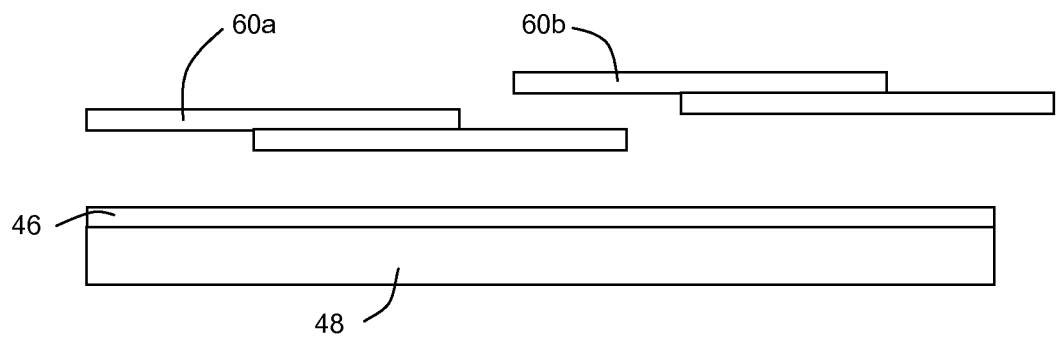
FIG. 6 provides a schematic view of an alternative embodiment.

FIG. 6 shows an alternative form of detector module in which 60a and 60b are dual-layer circuit boards which can be joined by overlapping the single layer portions and soldering or otherwise connecting them together to form a continuous dual-layer circuit board assembly. The modular circuit board sections can then be joined to one or more support boards 46 and 48.

Figure 7:
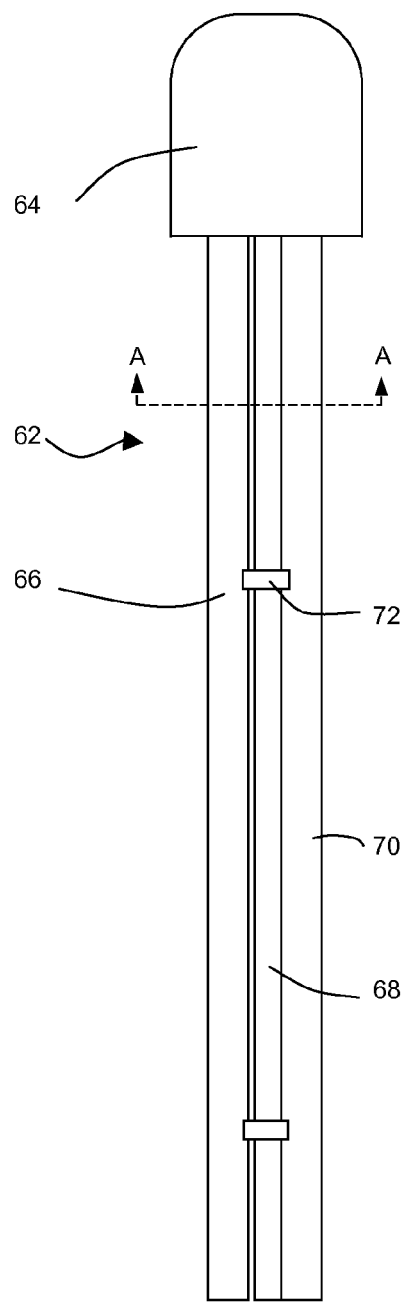
FIG. 7 provides a schematic view of a density profiler instrument according to one embodiment of the invention.
Figure 7A:
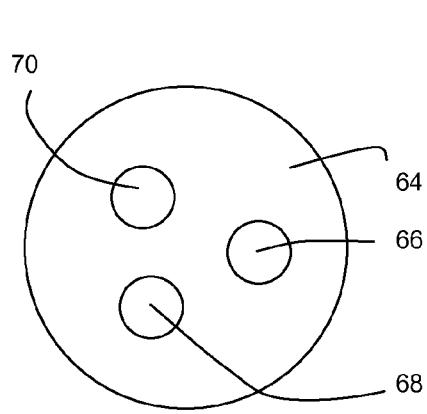
FIG. 7A shows a transverse section through the instrument along line A-A.

FIG. 7 shows a schematic view of a density profiler instrument 62 according to a preferred embodiment of the invention. The instrument comprises a housing 64 containing at least a high voltage generator, data loggers and counters, signal processing means data processors, means for supplying power to the voltage generator and electrical equipment and means for transmitting information between the data processors and an external location. The housing also supports a source array housed in tube 66 and two detector arrays, housed in tubes 68 and 70. The tubes are braced together for stability by braces 72. FIG. 7A shows a transverse section through the instrument along lines A-A and shows the configuration of the tubes 66, 68 and 70 relative to each other and the housing.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An instrument for the determination of fluid levels within a vessel by the comparison of the density of the fluid along the length of the instrument, said instrument comprising:
  (i) at least one generally linear source array comprising a plurality of sources of penetrating radiation, shielding and collimation means and a source supporting structure for supporting the sources and shielding and collimation means in a linear array, (ii) at least one generally linear detector array comprising a plurality of radiation detectors, supported on a detector support structure, capable of detecting radiation emitted by the sources, and (iii) means to position the source and a respective detector array such that
 (a) radiation emitted from each of the sources is capable of following a linear path from the source, through the vessel and material to at least a respective one of the detectors forming a part of the respective detector array,
 and
 (b) the linear axis of the source array and the linear axis of its respective detector array are substantially parallel to each other;

(iv) an analyser configured to determine from the detector output signals the density of the medium traversed by the beams of radiation in passing from a source to a detector, wherein the detector support structure is formed from a plurality of modular portions, each modular portion being adapted to be joined to an adjacent portion to provide a detector array of the required length.

2. An instrument according to claim 1, wherein the shielding and collimation means is formed from a different material from the supporting structure.

3. An instrument according to claim 2, wherein the shielding and collimation means is formed from a material which is highly attenuating to the penetrating radiation.

4. An instrument according to claim 3, wherein the shielding and collimation means is shaped so that the emission of radiation is confined, so far as possible, to two or more beams, each directed towards a different detector.

5. An instrument according to claim 1, wherein the source support structure is formed from steel.

6. An instrument according to claim 1, wherein the source support structure is formed from a plurality of modular portions, each portion being adapted to be joined to an adjacent portion.

7. An instrument according to claim 1, wherein one or more of the sources in the array are housed in a separate support member, which can be moved with respect to one or more collimation channels in the surrounding shielding material such that in a first position, at least one collimation channel is aligned with at least one of the sources such that a beam of collimated radiation is emitted along the collimation channel; and in a second position at least one of the sources is out of alignment with a collimation channel such that the emission of radiation from the source is blocked by the shielding material.

8. An instrument according to claim 1, wherein more than one electrical conduit is provided for carrying the high voltages from a voltage generator to the detectors.

9. An instrument according to claim 8, wherein the detectors which are connected to the same power source, voltage generator or electrical conduit are spaced apart and interspersed with detectors connected to a different power source or voltage generator by a different electrical conduit.

10. An instrument according to claim 1, further comprising a means for calculating a density at a location between non-adjacent detectors using the radiation detected by said non-adjacent detectors and stored information concerning a previously recorded radiation count.

11. An instrument according to claim 1, comprising one source array and two detector arrays, each source and detector array being located within an outer housing, and the source and detector arrays being radially angularly displaced from each other.

12. An instrument according to claim 1, wherein electrical circuits and connectors associated with the detector support structure are formed from a plurality of modular portions, each modular portion being adapted to be joined to an adjacent portion to provide a detector array of the required length.

13. An instrument according to claim 1, wherein the radiation detectors comprise at least one of a Geiger-Müller tube or a scintillation detector.

14. A detector array assembly for a level measurement instrument, comprising a plurality of detectors capable of detecting radiation mounted on a support structure formed from a plurality of modular portions, each portion being adapted to be joined to an adjacent portion to provide a detector array of the required length.

15. A detector array assembly according to claim 14, wherein the detectors comprise at least one of a Geiger-Müller tube or a scintillation detector.

16. A method of assembling a detector array for use in a density profiler instrument, the method comprising:
 forming an elongate circuit board from a plurality of modular circuit board portions,
 wherein the detector array comprises a support structure, a plurality of radiation detectors and the plurality of modular circuit board portions, said circuit board portions comprising means to mount at least one radiation detector thereupon, and means to join the support structure to more than one modular circuit board portion, thereby to form a detector array of required size.

17. A method for of assembling a detector array according to claim 16, wherein the radiation detectors comprise at least one of a Geiger-Müller tube or a scintillation detector.

18. An instrument for the determination of fluid levels within a vessel by the comparison of the density of the fluid along the length of the instrument, said instrument comprising:

(i) at least one generally linear source array comprising a plurality of sources of penetrating radiation, shielding and collimation means and a source supporting structure for supporting the sources and shielding and collimation means in a linear array, (ii) at least one generally linear detector array comprising a plurality of radiation detectors, supported on a detector support structure, capable of detecting radiation emitted by the sources, and (iii) means to position the source and a respective detector array such that:
 (a) radiation emitted from each of the sources is capable of following a linear path from the source, through the vessel and material to at least a respective one of the detectors forming a part of the respective detector array,
 and
 (b) the linear axis of the source array and the linear axis of its respective detector array are substantially parallel to each other;

(iv) an analyser configured to determine from the detector output signals the density of the medium traversed by the beams of radiation in passing from a source to a detector, wherein electrical circuits and connectors associated with the detector support structure are formed from a plurality of modular portions, each modular portion being adapted to be joined to an adjacent portion to provide a detector array of the required length.

19. An instrument according to claim 18, wherein the radiation detectors comprise at least one of a Geiger-Müller tube or a scintillation detector.

\* \* \* \* \*